(12) United States Patent
Lusso

(10) Patent No.: US 11,292,026 B2
(45) Date of Patent: Apr. 5, 2022

(54) GREASE INJECTION GUN CARTRIDGE ADAPTOR

(71) Applicant: Gurtech (Pty) Ltd., KwaZulu-Natal (ZA)

(72) Inventor: Cary Donald Lusso, KwaZulu-Natal (ZA)

(73) Assignee: GURTECH (PTY) LTD., Kwazulu-Natal (ZA)

( * ) Notice: Subject to any disclaimer, the term of this patent is extended or adjusted under 35 U.S.C. 154(b) by 171 days.

(21) Appl. No.: 16/562,929

(22) Filed: Sep. 6, 2019

(65) Prior Publication Data
US 2020/0078820 A1    Mar. 12, 2020

(30) Foreign Application Priority Data

Sep. 7, 2018 (GB) ..................................... 1814602

(51) Int. Cl.
*B05C 17/005* (2006.01)
*F16N 3/12* (2006.01)

(52) U.S. Cl.
CPC .......... *B05C 17/00596* (2013.01); *F16N 3/12* (2013.01); *B05C 17/00513* (2013.01)

(58) Field of Classification Search
CPC ......... B05C 17/00596; B05C 17/00513; F16N 3/12; F16N 37/02
See application file for complete search history.

(56) References Cited

U.S. PATENT DOCUMENTS

| 1,620,824 A * | 3/1927 | Manzel | F16N 3/12 141/311 R |
| 1,628,834 A * | 5/1927 | Frank | F16N 3/12 222/95 |

(Continued)

FOREIGN PATENT DOCUMENTS

| AT | 16324 U1 * | 7/2019 |
| DE | 202 01 292 U1 | 5/2002 |

(Continued)

OTHER PUBLICATIONS

Search Report for GB Application No. GB1814602.7 dated Feb. 27, 2019.

(Continued)

*Primary Examiner* — Vishal Pancholi
*Assistant Examiner* — Bob Zadeh
(74) *Attorney, Agent, or Firm* — Nixon & Vanderhye

(57) ABSTRACT

Disclosed is an adaptor for connecting a grease injection gun to either of a lipped or a threaded grease cartridge; the adaptor including a tubular sleeve, having an internal diameter slightly larger than the external diameter of the grease cartridge, but smaller than the lip of the lipped cartridge, for receiving the discharge end portion of the cartridge; and an adaptor head shaped and dimensioned to form a closure over the tubular sleeve, the adaptor head including an outer face configured to releasably connect with the grease injection gun, and an inner face shaped and configured to releasably connect with the tubular sleeve and the cartridge, with a flow passage extending between the outer face and the inner face, for fluid communication between the grease injection gun and the cartridge.

10 Claims, 6 Drawing Sheets

(56) References Cited

U.S. PATENT DOCUMENTS

| | | | | |
|---|---|---|---|---|
| 2,063,412 A | * | 12/1936 | Tear | F16N 3/12 |
| | | | | 222/383.1 |
| 2,506,204 A | * | 5/1950 | Joseph | F16N 3/12 |
| | | | | 206/384 |
| 2,650,744 A | * | 9/1953 | Dirksen | F16N 3/12 |
| | | | | 222/383.1 |
| 2,758,758 A | | 8/1956 | Schimpf | |
| 3,187,959 A | * | 6/1965 | Morehouse | F16N 3/12 |
| | | | | 222/256 |
| 3,341,084 A | * | 9/1967 | Sundholm | F16N 3/12 |
| | | | | 222/260 |
| 5,044,471 A | * | 9/1991 | Machek | F16N 3/12 |
| | | | | 184/105.2 |
| 6,467,579 B1 | | 10/2002 | Simon | |
| 6,834,781 B1 | * | 12/2004 | Mueller | F16N 5/02 |
| | | | | 222/262 |
| 2013/0327790 A1 | | 12/2013 | Ryan | |
| 2017/0205028 A1 | * | 7/2017 | Sorg | F16N 37/02 |
| 2018/0202604 A1 | | 7/2018 | Sorg | |

FOREIGN PATENT DOCUMENTS

| | | |
|---|---|---|
| DE | 20 2016 102 544 U1 | 7/2016 |
| EP | 3 002 496 A1 | 4/2016 |
| WO | 2017/124070 A1 | 7/2017 |

OTHER PUBLICATIONS

Extended European Search Report issued in European Patent Application No. 19192954.6 dated Jan. 28, 2020.

* cited by examiner

GREASE INJECTION GUN CARTRIDGE ADAPTOR

TECHNICAL FIELD OF THE INVENTION

This invention relates to an adaptor for connecting a grease injection gun to a standard grease cartridge with various end types

BACKGROUND ART

Grease injection guns, also known as mini grease guns are most commonly used in assembly applications where precise amounts of high grade grease need to be applied to components with relatively good accuracy and at low pressure—for example, during the assembly of Bicycles. Grease injection guns are commonly available in two distinct variants, the first of which connects to a 150 ml tube of grease or to a small 3 ounce cartridge or similar and the second type being a grease injection gun with an integrated reservoir which is required to be manually filled with grease before it can be used.

However, very few lubricant manufacturers package grease into the 150 ml tube or the 3 ounce cartridge or similar. This leaves the user the only alternative of using a grease injection gun with a self-contained reservoir which must be manually filled from a pail, cartridge or tub of grease, whichever is readily available. The manual filling of these reservoirs poses the inherent risk of contaminating the grease as well as the mess of handling the grease and spooning it with a spatula or ones finger into the small reservoir.

The majority of lubricant manufacturers do however offer their range of greases in standard 400 gram cartridges; the most common types of cartridges have either a threaded discharge end or a discharge end with an outer lip. Up until now there has been no way of attaching a grease injection gun to either of these standard cartridges.

In this specification, the phrase a "lipped grease cartridge" is understood to mean 400 g prefilled grease cartridge having an outer lip around the circumference of its discharge end, and a "threaded grease cartridge" is understood to mean a 400 g prefilled grease cartridge having a threaded outlet at its discharge end.

SUMMARY OF THE INVENTION

According to the invention there is provided an adaptor for connecting a grease injection gun to either of a lipped or a threaded grease cartridge; the adaptor comprising a tubular sleeve, having an internal diameter slightly larger than the external diameter of the grease cartridge, but smaller than the lip of the lipped cartridge, for receiving the discharge end portion of the cartridge; and an adaptor head shaped and dimensioned to form a closure over the tubular sleeve, the adaptor head comprising an outer face configured to releasably connect with the grease injection gun, and an inner face shaped and configured to releasably connect with the tubular sleeve and the cartridge, with a flow passage extending between the outer face and the inner face, for fluid communication between the grease injection gun and the cartridge.

The releasable connection between the tubular sleeve and the inner face of the adaptor head may be achieved by a screw threaded connection, the inner face of the adaptor head comprising a first internally threaded recess, dimensioned to receive a complementary externally threaded portion of the sleeve.

A sealing ring may be located in a groove at the base of the first threaded recess to provide an air tight seal between the tubular sleeve and the adaptor head or between the discharge end of the lipped grease cartridge and the adaptor head when assembled.

A second threaded recess, complimentary in diameter to the threaded outlet of the threaded grease cartridge may be concentrically located in the base of the first recess, in communication with the outlet passage.

An outlet pipe, slightly smaller in diameter to an inlet port of the grease injection gun, extends from the flow passage at the outer face of the adaptor head, the outlet pipe of the adaptor head is receivable in the inlet port of the grease injection gun and releasably connected by a screw threaded connection.

An o-ring seal is locatable at the base of the outlet pipe to allow for an air tight seal between the adaptor head and the grease injection gun.

In an alternative embodiment of the invention, the tubular sleeve may be adapted to act as a manually fillable reservoir in the absence of a cartridge, by the insertion of a grease follower into the base of the adaptor sleeve.

BRIEF DESCRIPTION OF THE DRAWINGS

The preferred embodiment of the invention is described below with reference to the accompanying drawings in which:

FIGS. 2A & 2B: are detailed views of the two commercially available grease cartridge variants, in which FIG. 2A is a cartridge with a retaining lip on the discharge end; and FIG. 2B is a cartridge with a threaded discharge end.

DETAILED DESCRIPTION OF THE PREFERRED EMBODIMENT

Figure 6:
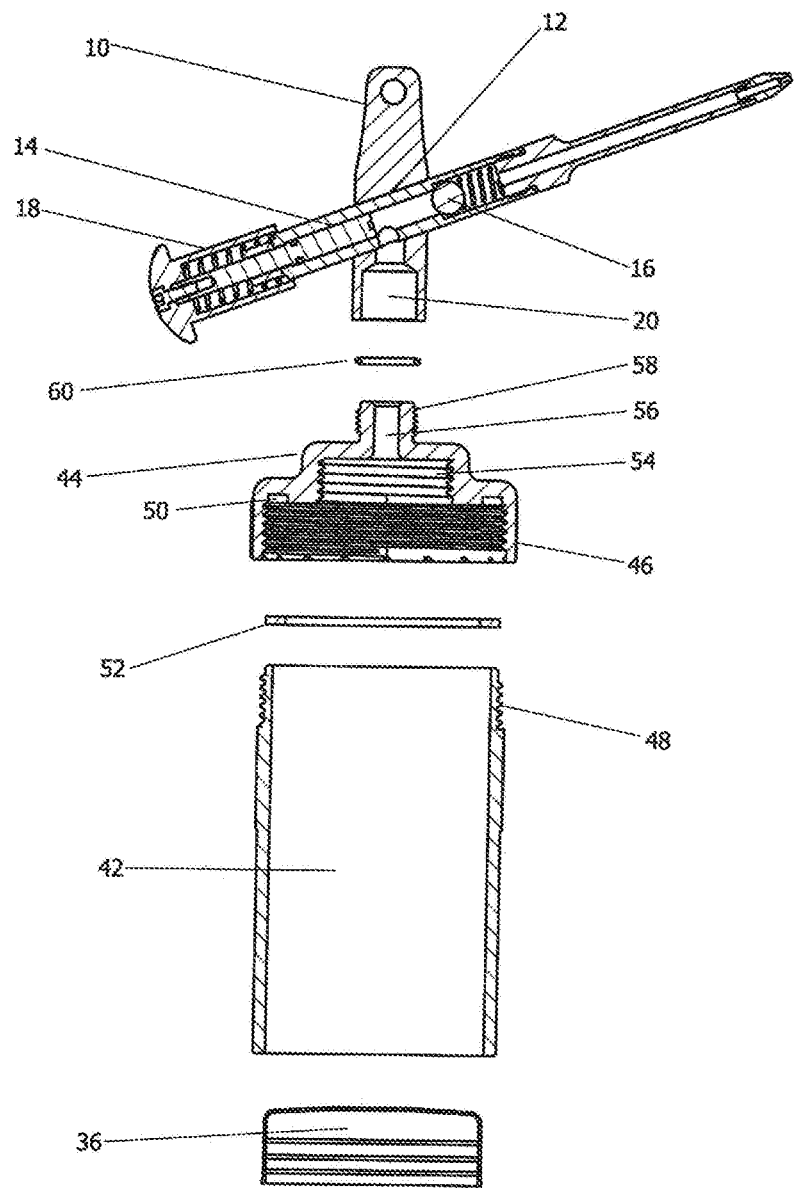
FIG. 6 is an exploded view of the connector of the invention.

Referring to the drawings and with particular reference to the reference numerals in FIG. 6, a grease injection gun (10) as known in the art is depicted. The grease injection gun (10) draws grease into the delivery chamber (12) by means of a vacuum. As the piston (14) is pushed forward, the grease is pushed past the delivery valve (16). On the return stroke of the piston (14), which is effected by a spring (18), the delivery valve (16) shuts off and the vacuum is created. As the piston (14) then retracts past the inlet port (20) the negative pressure within the delivery chamber draws the grease in from the grease reservoir, grease cartridge or grease tube to which the grease injection gun is attached.

Figure 1:
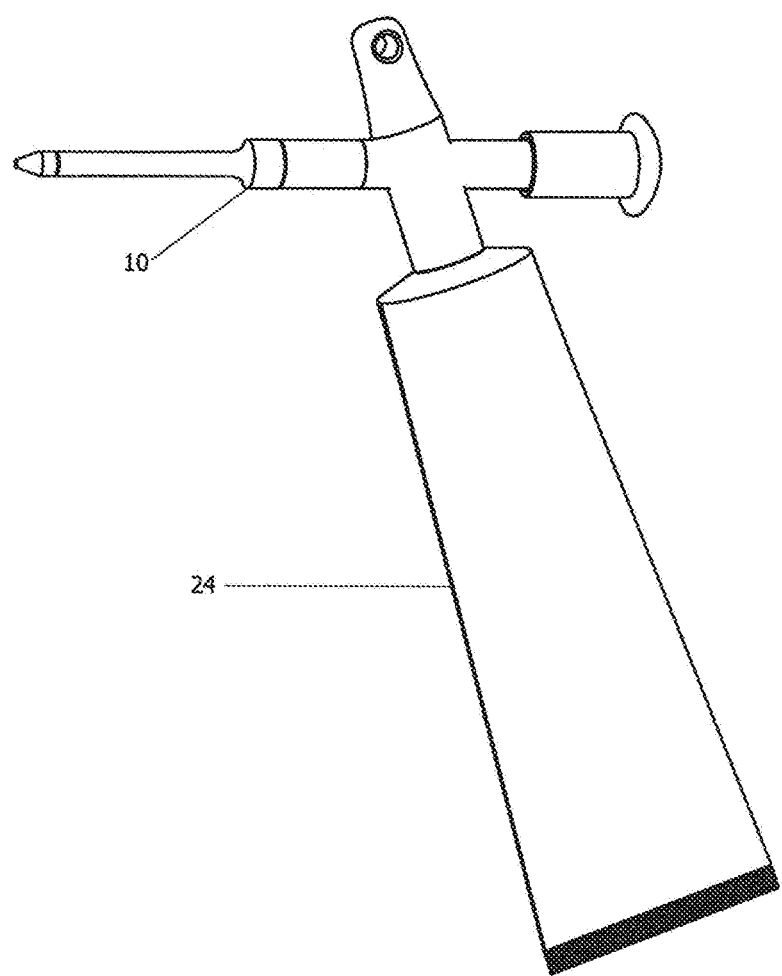
FIG. 1: shows a prior art application of a grease injection gun attached to a 150 ml or similar grease tube.

Referring to FIG. 1, the grease injection gun as currently known in the art is configured to be attached to a 150 ml tube of grease (24) by a screw threaded connection. The inlet port of the grease injection gun (10) is attached to the outlet nozzle (not shown) of the grease tube (24) by a screw threaded connection.

Figures 2A, 2B:
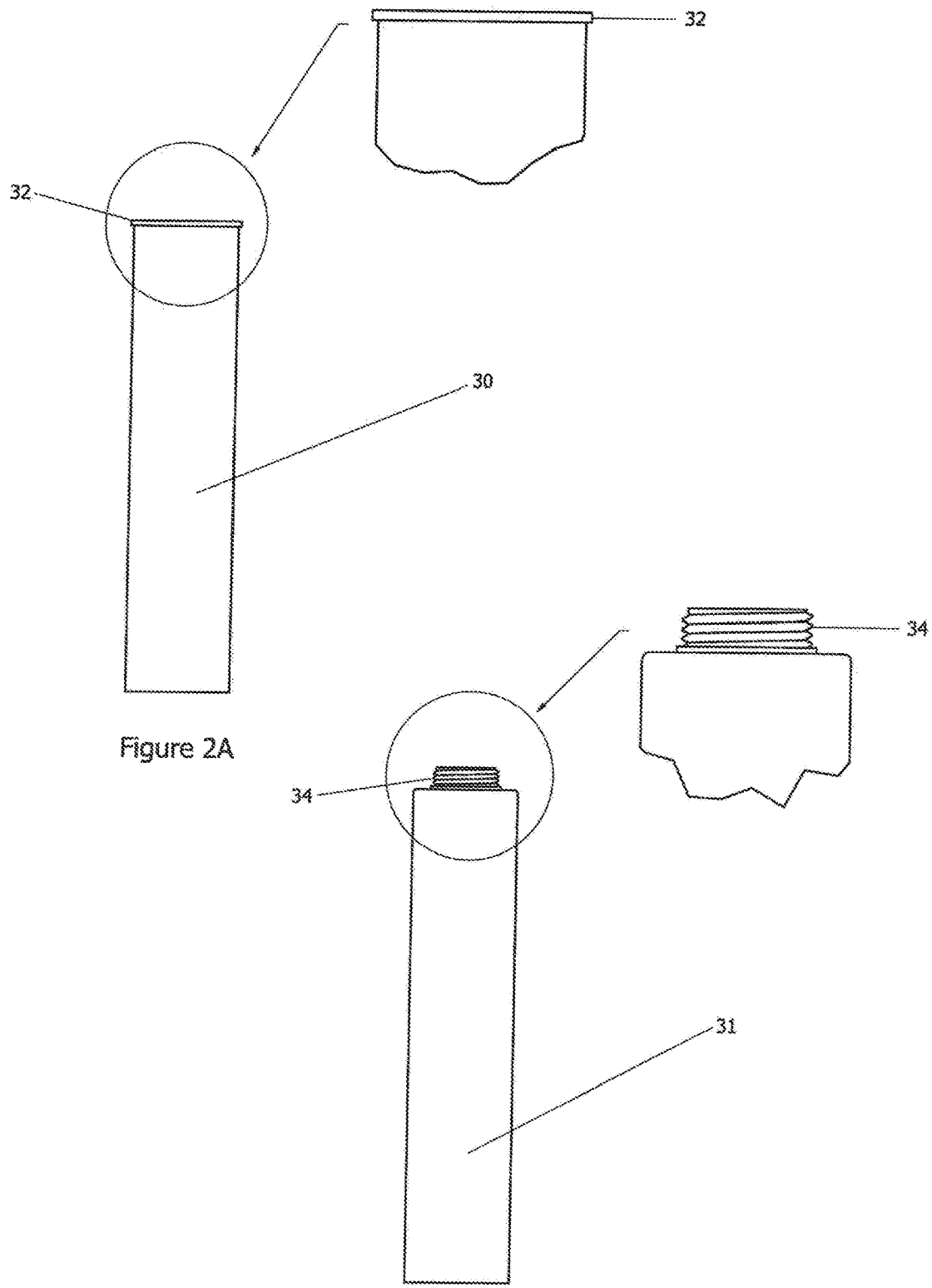

Referring to FIGS. 2A and 2B, grease manufacturers commonly distribute grease in 400 g cartridges (30, 31) or in larger sized containers. The cartridges are ordinarily adapted for use with high pressure grease guns, and are available either with an outer lip (32) at their discharge end, as depicted in FIG. 2A or with a threaded outlet (34) at their discharge end, as depicted in FIG. 2B. The diameter of both the lip (32) and the nozzle (34) of these cartridges (30) is far larger than the diameter of the inlet port (20) of the grease injection gun (10). Both styles of cartridges have a grease follower (36) inserted at the base of the cartridge, which moves up the cartridge as the grease is sucked from the cartridge by vacuum.

The inventor is not aware of any adaptor mechanism available that would enable connection of the grease injection gun (10), to a 400 g grease cartridge or similar.

Referring to FIGS. 3 to 6, the adaptor (40) for connecting a grease injection gun (10) to a commercially available 400 g prefilled grease cartridge (30, 31) or similar, having either an outer retaining lip (32), or a threaded outlet (34) at its discharge end, comprises of a tubular sleeve (42) and an adaptor head (44).

The internal diameter of the tubular sleeve (42) is slightly larger than the external diameter of the grease cartridge (30, 31) but smaller than the outer retaining lip (32) of a lipped cartridge.

The adaptor head (44) is shaped and dimensioned to fit over the tubular sleeve (42). A first internally threaded recess (46), dimensioned to receive a complementary externally threaded portion (48) of the tubular sleeve (42), is located in the inner face of the adaptor head (44). This facilitates a screw threaded releasable connection between the tubular sleeve (42) and the adaptor head (44).

A circular groove (50) is located at the base of the first threaded recess (46) of the adaptor head (44) for accommodating a sealing ring (52) and to provide for an air tight seal between the sleeve (42) and the adaptor head (44) or between the discharge end (32) of the lipped grease cartridge (30) and the adaptor head (44) when assembled.

A second internally threaded recess (54), complimentary in diameter to the threaded outlet (34) of the threaded grease cartridge (31) is concentrically located within the base of the first recess (46) in the inner face of the adaptor head.

A flow passage (56) extends from the base of the second recess (54) through the adaptor head (44) and terminates in an externally threaded outlet pipe (58) extending from the top of the adaptor head (44) and receivable in a complementary internally threaded inlet port (20) in the grease injection gun, for the connection in fluid communication of the grease injection gun to the adaptor head.

An o-ring seal (60) is locatable in a groove at the base of the threaded outlet (58) to allow for an air tight seal to be achieved between the adaptor head (44) and the grease injection gun (10).

The correct airtight sealing between the grease injection gun and the adaptor head and between the tubular sleeve and the adaptor head is critically important to ensure that when a vacuum is generated during pumping, grease, and not air is drawn into the delivery chamber.

Figures 3A, 3B:
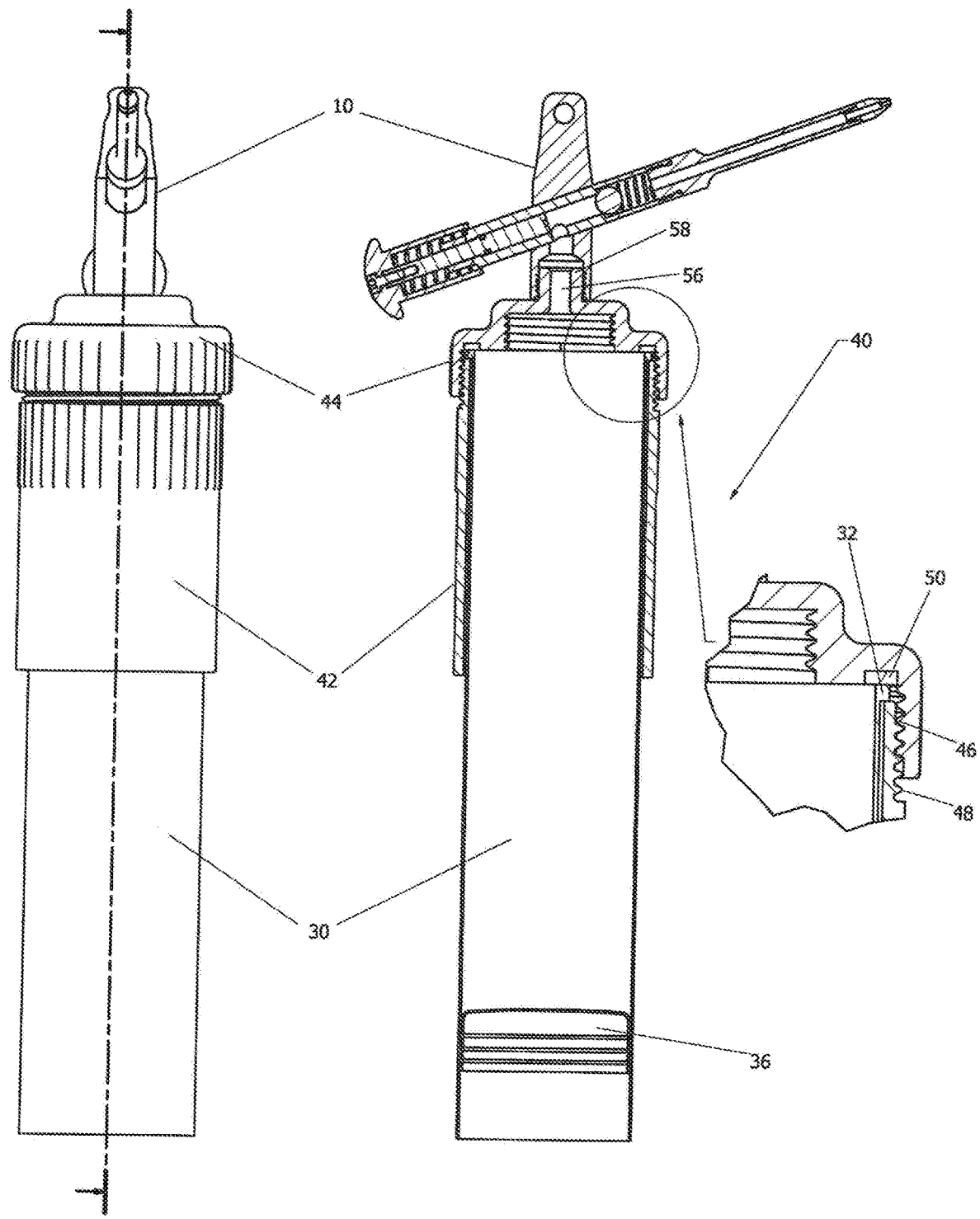
FIG. 3A is a front view of the connector of the invention, connected to a grease injection gun, and a lipped type grease cartridge.
FIG. 3B is a cross-sectional view of FIG. 3A section A-A

Referring to FIGS. 3A and 3B, when a grease cartridge (30) with an outer retaining lip (32) is required to be connected to the grease injection gun (10), the retaining sleeve (42) is first disconnected from the adaptor head (44). The cartridge (30) is placed inside the retaining sleeve (42) so that the lipped end (32) of the cartridge coincides with the threaded end of the retaining sleeve (42). The now combined sleeve (42) and cartridge (30) is screwed back into the adaptor head (44) with the lip (32) of the grease cartridge being pressed against the sealing ring (52), effecting an air tight seal.

Figures 4A, 4B:
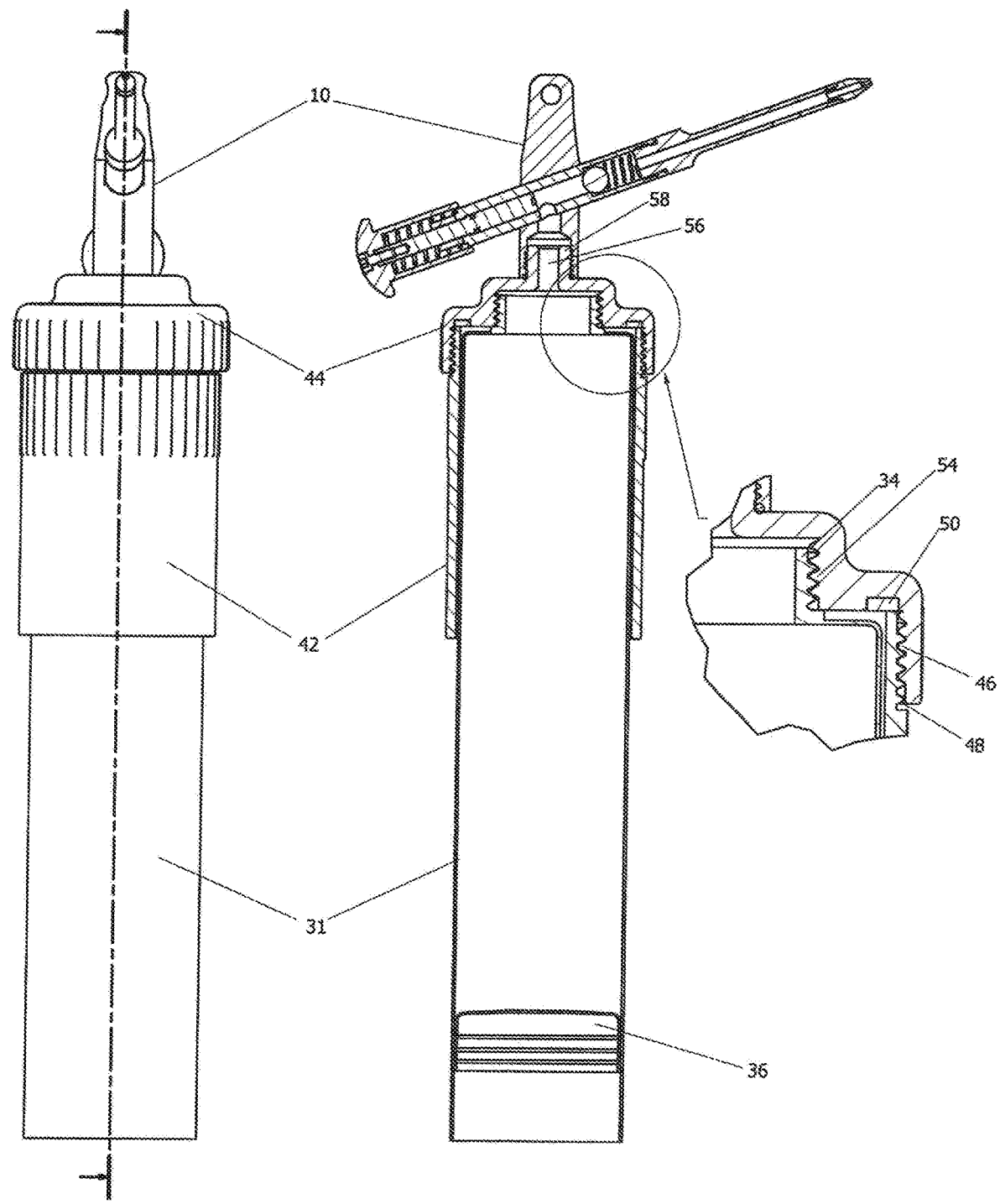
FIG. 4A is a front view of the connector of the invention, connected to a grease injection gun, and a grease cartridge with a threaded discharge end.
FIG. 4B is a cross-sectional view of FIG. 4A section B-B.

Referring to FIGS. 4A and 4B, when a grease cartridge (31) with a threaded discharge end (34) is required to be connected to the grease injection gun (10), the retaining sleeve (42) is screwed into the adaptor head (44), with the top of the sleeve being pressed against the sealing ring (52). The cartridge (31) is then pushed into the sleeve until the threaded discharge end (34) of the cartridge comes into contact with the internally threaded second recess (54) of the adaptor head. The threaded discharge end is then screwed directly into the second recess (54) of the adaptor head (44). In this scenario, the sleeve (42) provides additional support to the grease cartridge (31).

Figure 5A:
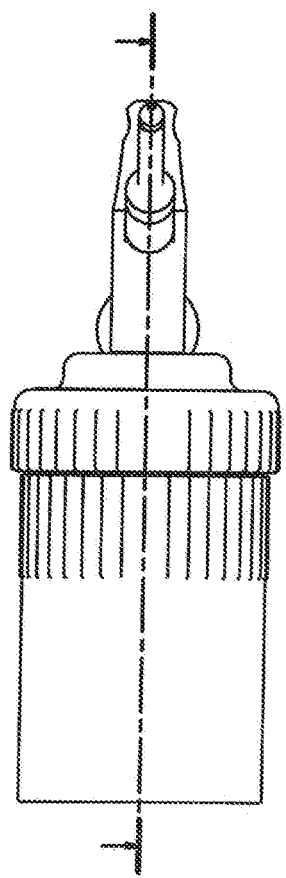
FIG. 5A is a front view of the connector of the invention used as a manually re-fillable system
Figure 5B:
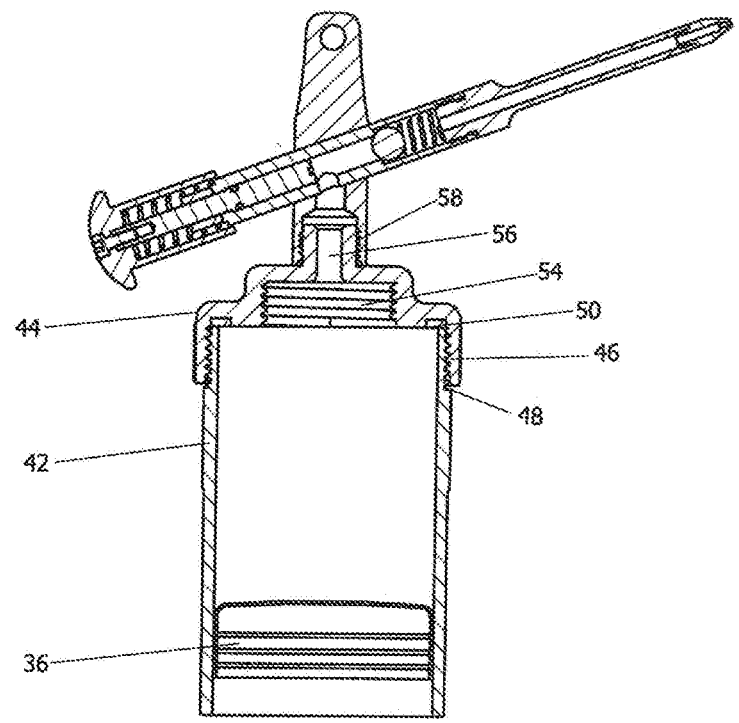
FIG. 5B is a cross-sectional view of FIG. 5A section C-C

As depicted in FIG. 5 the adaptor retaining sleeve can also be utilised as a manually refillable reservoir in those exceptional cases where grease cannot be sourced in either of the standard 400 g cartridges or similar. In this embodiment, a grease follower (36) manufactured from a suitably flexible material may be inserted into the base of the adaptor sleeve (42) and configured to create an airtight seal.

The sleeve (42) is then unscrewed from the adaptor head (44) and forms a reservoir which can be manually filled with grease. Once the grease has been placed inside the sleeve (42), the sleeve is reattached to the adaptor head, which is attached to the grease injection gun. This should be done in such a way that a minimal amount of air is trapped within the grease.

In all cases, before the sleeve (42) or grease cartridge is attached to the adaptor head (44), the grease follower (36) should be pushed forward to a point where the grease is flush with the discharge end of the grease cartridge or retaining sleeve. Furthermore after attaching to the adaptor head the grease follower (36) may need to be manually pushed forward while pumping the grease injection gun until any trapped air is expelled from the system. From then on the vacuum generated will continue to draw grease into the delivery chamber on each consecutive stroke and the grease follower (36) will move towards the discharge end of the cartridge or retaining sleeve.

Testing has proved that there are significant benefits to utilizing such an adaptor to connect a grease injection gun to standard 400 g cartridges or similar. The benefits include:

It is common practice for lubricant manufacturers to pack a wide range of greases into 400 g cartridges or similar.

It is a mess free operation when the cartridge needs to be replaced;

the grease remains within the cartridge so the user always knows the specification of the grease and the risk of contamination is limited.

A grease injection gun is less bulky and easier to handle than a large high pressure grease gun so in applications where small precise amounts of grease needs to be applied at low pressures it is a more appropriate technology.

The user has the versatility to use the same grease injection gun for various pack types and should always find the grade of grease required, packed in a way that can be dispensed with the same grease injection gun.

The invention claimed is:

1. An adaptor (40) for selectively connecting a grease injection gun (10) to each of a lipped (30) grease cartridge and a threaded (31) grease cartridge, the adaptor (10) comprising:
    a tubular sleeve (42),
    the tubular sleeve (42) having an internal diameter larger than an external diameter of the grease cartridge (30, 31) but smaller than a lip of the lipped grease cartridge (30), the tubular sleeve for receiving a discharge end portion of the cartridge; and
    an adaptor head (44) shaped and dimensioned to form a closure over the tubular sleeve (42),
    the adaptor head (44) comprising an outer face configured to releasably connect with the grease injection gun (10), an inner face configured to releasably connect with the tubular sleeve (42) and the grease cartridge (30, 31), and a flow passage (56) extending between the outer face and the inner face, the flow passage (56) for fluid communication between the grease injection gun (10) and the grease cartridge (30,31),
    the inner face of the adaptor head (44) having a base with a first internally threaded recess (46) dimensioned to receive the lip of the lipped cartridge and dimensioned to receive a complementary externally threaded portion (48) of the tubular sleeve (42) in a screw threaded connection,
    the adaptor head (44) further comprising a second threaded recess (54) complimentary in diameter to a threaded outlet (34) of the threaded grease cartridge (31), the second threaded recess (54) being concentrically located in the base with the first recess (46) and in communication with the flow passage (56),
    wherein the flow passage (56) terminates in an outlet pipe (58), the outlet pipe (58) being smaller in diameter than an inlet port (20) of the grease injection gun (10), extending from the outer face of the adaptor head (44), and
    wherein the outlet pipe (58) of the adaptor head (44) is receivable in the inlet port (20) of the grease injection gun (10) and releasably connected by a screw threaded connection.

2. The adaptor (40) as claimed in claim 1, further comprising a sealing ring (52) located in a groove (50) at the base of a first threaded female recess (46) of the adaptor head (44) to provide an air tight seal between the sleeve (42) and the adaptor head (44) or between the discharge end (32) of the lipped grease cartridge (30) and the adaptor head (44) when assembled.

3. The adaptor as claimed in claim 2, further comprising an o-ring seal (60) locatable in a groove at the base of the outlet pipe (58) to provide for an air tight seal between the adaptor head (44) and the grease injection gun (10).

4. The adaptor as claimed in claim 1 in which the tubular sleeve (42) is adapted to act as a manually fillable reservoir in the absence of the cartridge, and includes a grease follower (36) insertable into the base of the tubular sleeve (42).

5. The adaptor (40) as claimed in claim 1 in combination with the lipped (30) grease cartridge and the threaded (31) grease cartridge.

6. The adaptor (40) as claimed in claim 1 in combination with the lipped (30) grease cartridge and the threaded (31) grease cartridge,
    the adaptor (40) further comprising a sealing ring (52) located in a groove (50) at the base of a first threaded female recess (46) of the adaptor head (44) to provide an air tight seal between the sleeve (42) and the adaptor head (44) or between the discharge end (32) of the lipped grease cartridge (30) and the adaptor head (44) when assembled.

7. An adaptor (40) for connecting a grease injection gun (10) to a grease cartridge (30, 31), the adaptor (10) comprising:
    a tubular sleeve (42) for receiving a discharge end portion of the cartridge, the tubular sleeve (42) having an internal diameter; and
    an adaptor head (44) shaped and dimensioned to form a closure over the tubular sleeve (42),
    the adaptor head (44) comprising an outer face configured to releasably connect with the grease injection gun (10), an inner face configured to releasably connect with the tubular sleeve (42) and the grease cartridge (30, 31), and a flow passage (56) extending between the outer face and the inner face, the flow passage (56) for fluid communication between the grease injection gun (10) and the grease cartridge (30,31),
    the inner face of the adaptor head (44) having a base with an internally threaded first recess (46) of a first size dimensioned to receive a complementary externally threaded portion (48) of the tubular sleeve (42) in a screw threaded connection,
    the adaptor head (44) further comprising an internally threaded second recess (54) of a second size, an inside diameter of the second recess (54) being smaller than an inside diameter of the tubular sleeve (42), the second recess (54) being concentrically located in the base having the first recess (46) and in communication with the flow passage (56),
    wherein the flow passage (56) terminates in an outlet pipe (58), the outlet pipe (58) being smaller in diameter than an inlet port (20) of the grease injection gun (10), extending from the outer face of the adaptor head (44), and
    wherein the outlet pipe (58) of the adaptor head (44) is receivable in the inlet port (20) of the grease injection gun (10) and releasably connected by a screw threaded connection.

8. The adaptor (40) as claimed in claim 7, further comprising:
    a sealing ring (52) located in a groove (50) at the base of a first threaded female recess (46) of the adaptor head (44) to provide an air tight seal between the sleeve (42) and the adaptor head (44) or between the discharge end (32) of the grease cartridge (30) and the adaptor head (44) when assembled, and
    an o-ring seal (60) locatable in a groove at the base of the outlet pipe (58) to provide for an air tight seal between the adaptor head (44) and the grease injection gun (10).

9. The adaptor as claimed in claim 7, wherein the tubular sleeve (42) is adapted to act as a manually fillable reservoir in the absence of the cartridge, and further comprises a grease follower (36) insertable into the base of the tubular sleeve (42).

10. The adaptor (40) as claimed in claim 7 in combination with the grease cartridge where the grease cartridge is selectively a lipped (30) grease cartridge and a threaded (31) grease cartridge, wherein,
    the second recess (54) is complimentary in diameter to a threaded outlet (34) of the threaded grease cartridge (31),
    an external diameter of the grease cartridge (30,31) is smaller than a lip of the lipped grease cartridge (30), the internal diameter of the tubular sleeve is smaller than a lip of the lipped cartridge, and the adaptor (10) selectively connects the grease injection gun (10) to each of the lipped (30) grease cartridge and the threaded (31) grease cartridge.

\* \* \* \* \*